(12) United States Patent
Schoenfelder

(10) Patent No.: US 10,155,626 B2
(45) Date of Patent: Dec. 18, 2018

(54) GUIDING DEVICE, IN PARTICULAR FOR TRANSPORT GUIDING OF CONTAINERS

(71) Applicant: KRONES AG, Neutraubling (DE)

(72) Inventor: Markus Schoenfelder, Regensburg (DE)

(73) Assignee: KRONES AG (DE)

( * ) Notice: Subject to any disclaimer, the term of this patent is extended or adjusted under 35 U.S.C. 154(b) by 0 days.

(21) Appl. No.: 15/740,558

(22) PCT Filed: Dec. 5, 2016

(86) PCT No.: PCT/EP2016/079724
§ 371 (c)(1),
(2) Date: Dec. 28, 2017

(87) PCT Pub. No.: WO2017/093556
PCT Pub. Date: Jun. 8, 2017

(65) Prior Publication Data
US 2018/0186575 A1 Jul. 5, 2018

(30) Foreign Application Priority Data
Dec. 3, 2015 (DE) ........................ 10 2015 121 081

(51) Int. Cl.
*B65G 21/20* (2006.01)
(52) U.S. Cl.
CPC .. *B65G 21/2072* (2013.01); *B65G 2201/0244* (2013.01)
(58) Field of Classification Search
CPC ............................................. B65G 21/20072

USPC ................. 198/836.1, 836.3, 836.4
See application file for complete search history.

(56) References Cited

U.S. PATENT DOCUMENTS

| 4,467,909 A | 8/1984 | Joerss |
| 5,291,988 A | 3/1994 | Leonard |
| 6,059,096 A * | 5/2000 | Gladieux ........... B65G 21/2072 |
| | | 198/836.3 |

(Continued)

FOREIGN PATENT DOCUMENTS

| JP | 04041319 | 2/1992 |
| JP | 0496432 | 8/1992 |

(Continued)

OTHER PUBLICATIONS

International Search Report dated Mar. 3, 2017 issued in corresponding International Application No. PCT/EP2016/079724.

(Continued)

*Primary Examiner* — Douglas A Hess
(74) *Attorney, Agent, or Firm* — Onello & Mello, LLP

(57) ABSTRACT

A guiding device for contacting and guiding objects and in particular containers with a contacting device which is suitable and intended for contacting an outside surface of the object to be guided by means of a contact surface, wherein this contacting device comprises a support extending along a predetermined extension direction. According to the invention, a plurality of contact elements is arranged on the support, wherein these contact elements are each rotatable relative to the extension direction of the support such that a spacing between at least a portion of the contact surface and the extension direction can be varied by means of this rotational motion.

11 Claims, 10 Drawing Sheets

(56) References Cited

U.S. PATENT DOCUMENTS

| | | | | |
|---|---|---|---|---|
| 6,378,695 B1* | 4/2002 | Rinne | ................ | B65G 21/2072 198/836.3 |
| 6,454,084 B2* | 9/2002 | Csiki | ................ | B65G 21/2072 198/836.1 |
| 7,748,523 B2* | 7/2010 | Robertson | .......... | B65G 21/2072 198/831 |
| 8,186,503 B1* | 5/2012 | Burchell | ............ | B65G 21/2072 198/836.3 |
| 8,499,921 B1* | 8/2013 | Orndorff | ............ | B65G 21/2072 198/479.1 |
| 9,073,698 B2* | 7/2015 | Huettner | ............ | B65G 21/2072 |
| 9,340,364 B2* | 5/2016 | Papsdorf | ................ | B65G 29/00 |
| 2013/0180830 A1 | 7/2013 | Orndorff et al. | | |

FOREIGN PATENT DOCUMENTS

| | | |
|---|---|---|
| JP | 2011178550 | 9/2011 |
| WO | 03042075 | 5/2003 |

OTHER PUBLICATIONS

German Search Report dated Jul. 14, 2016 issued in corresponding German Application No. 102015121081.9.

* cited by examiner

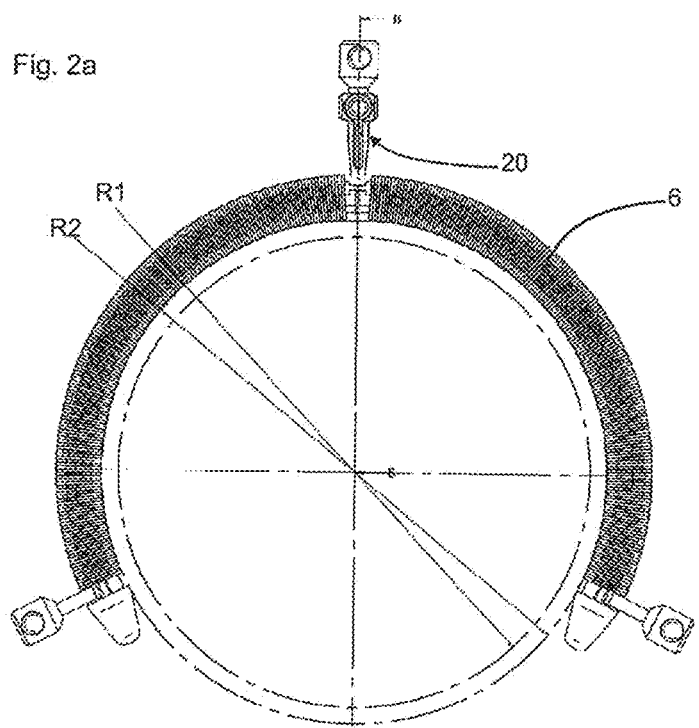
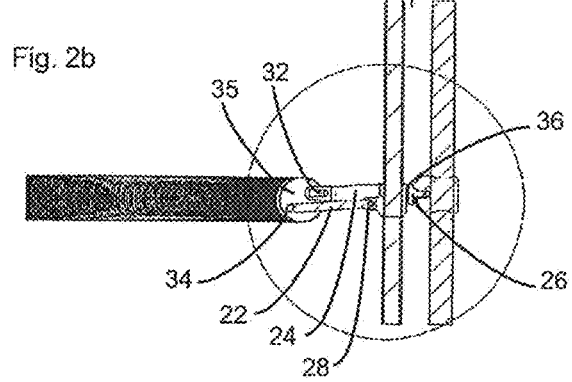
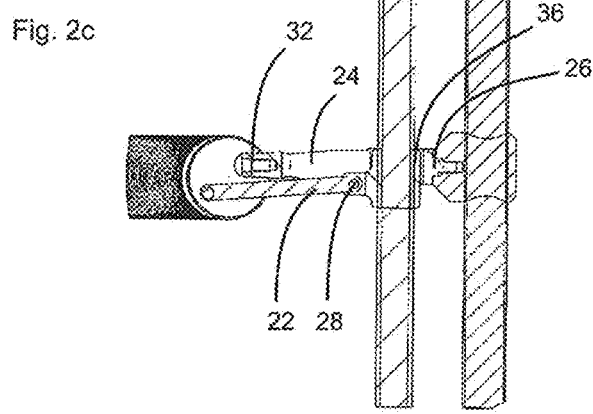

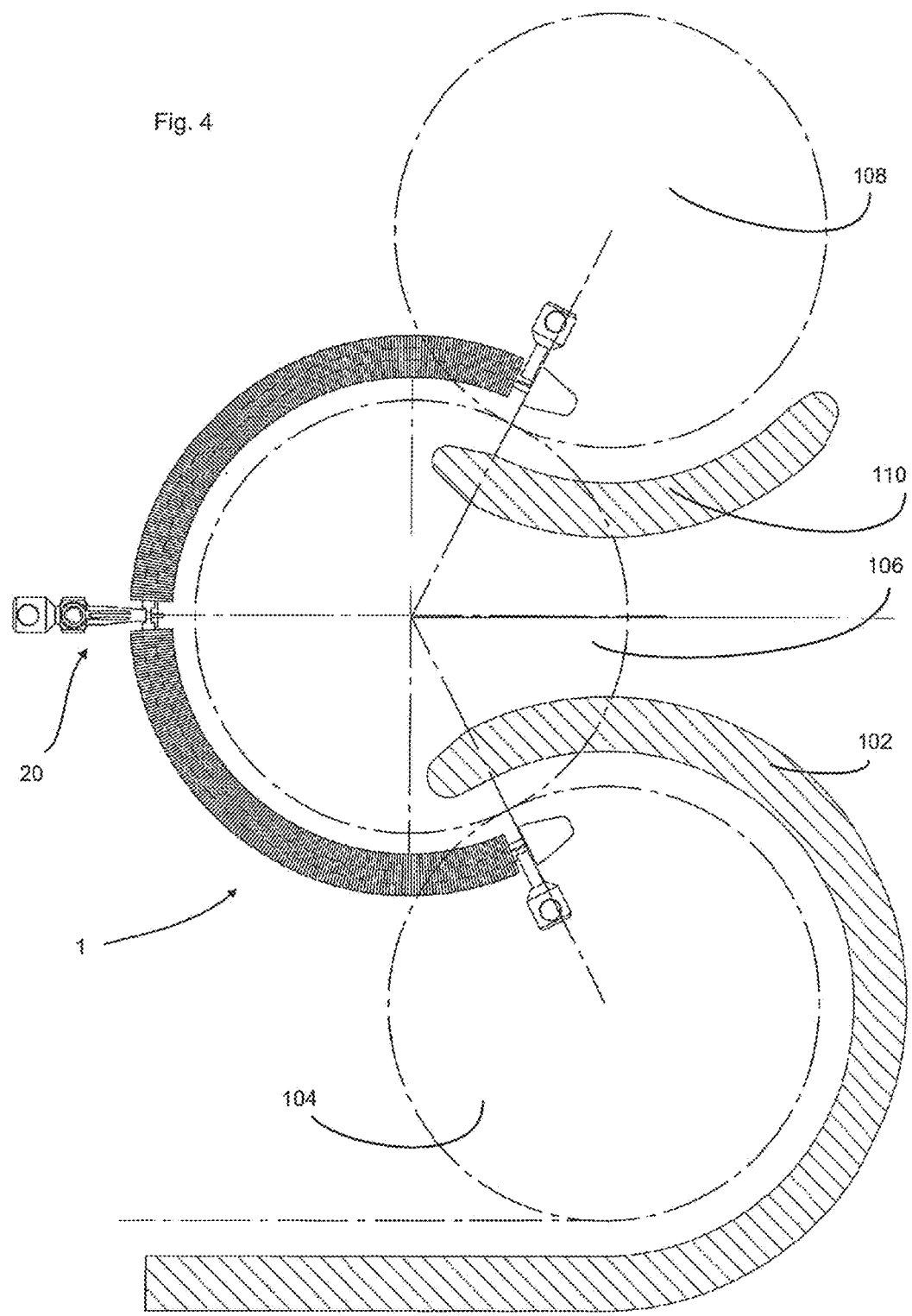

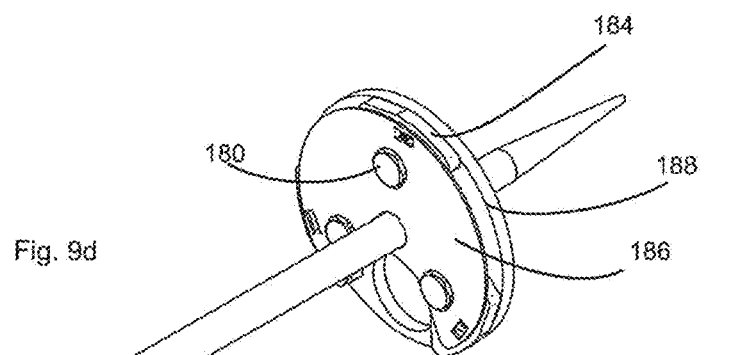
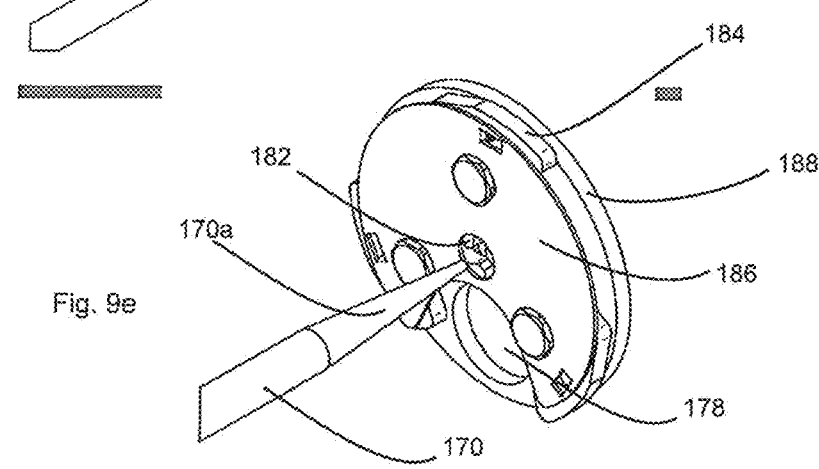
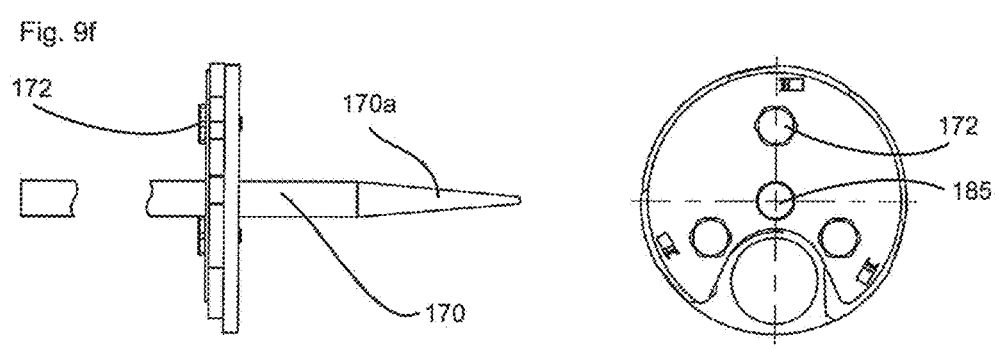
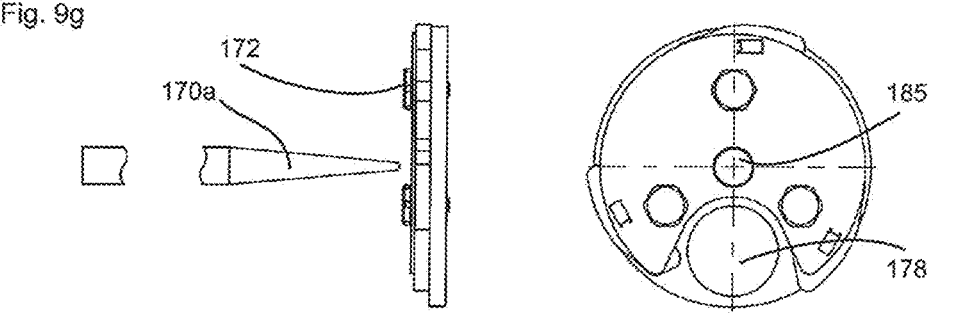

GUIDING DEVICE, IN PARTICULAR FOR TRANSPORT GUIDING OF CONTAINERS

The present invention relates to a guiding device, in particular for use in transporting containers. Various container manufacturing devices are known from the state of the art, in which e.g. the containers are transported from a first processing apparatus to a further processing apparatus, e.g. from a blow moulding machine to a downstream filling machine which fills the containers with a liquid. These guiding devices, such as guide rails and the like, are generally adapted to specific containers and in particular to their geometries, such as their cross-section. In one apparatus known from the state of the art, a conversion of geometries can occur e.g. via conical guides and via adjustable star wheel geometries. Although this approach has proven itself technically, it is, however, relatively cumbersome and also difficult to clean. It is often not possible to achieve smooth and secure guiding of a specific object, such as a container, e.g. from one transport star wheel to the next transport star wheel, e.g. a processing carousel. This applies e.g. to the transport of containers from a filling device to a capper.

It is therefore the object of the present invention to provide a simpler design for such transport and/or guiding devices, and in particular to also enable the conversion of fittings, e.g. an adjustment for different container cross-sections in a simpler manner. According to the invention, these objects are achieved by the subject matters of the independent claims. Advantageous embodiments and developments are the subject matter of the subordinate claims.

A guiding device according to the invention for contacting and/or guiding objects and in particular containers and/or components of containers such as in particular, but not limited to, container closures, comprises a contacting apparatus suitable for and intended for touching an external surface of the object to be guided by means of a contact surface, wherein this contacting device further comprises a support extending along a predetermined extension direction. According to the invention, a plurality of contact elements is disposed on the support, wherein these contact elements are rotatable and/or pivotable relative to the extension direction of the support such that a distance between at least a portion of the contact surface and the extension direction can be varied by means of this rotational movement.

It is therefore proposed that these contact elements are arranged specifically to be movable relative to the extending device or the extension direction, and that e.g. a radius of the guiding device can be varied by rotation. It should, however, be noted that the present invention is not only applicable to curved guiding devices but also to guiding devices running in a straight line. The curved guiding devices may e.g. be guiding devices that are circularly curved or guiding devices curved in a C shape. The guiding device serves in particular to guide the containers during transport of the same.

By varying the rotary position of the contact elements, e.g. a radius of curvature of the contact surface can thus be varied. In particular, said surface of the containers being touched by the contact surface is an external surface of the containers, in particular a circumferential wall of the containers. The containers are specifically circular containers, however, application to oval containers or containers having other geometries is also conceivable.

The containers are specifically plastic containers, however, it is also conceivable to apply the invention to other containers such as glass containers or tins, i.e. metal containers. In particular, the containers are bottles. In particular, the containers are containers that are being filled or are to be filled with liquids or solids.

In a further preferred embodiment, the guiding device comprises at least one setting device for varying the rotary position of at least one contact element relative to the extension direction. A setting device may be provided, comprising e.g. an actuator such as an electromotive, pneumatic or hydraulic actuator, and which preferably varies the rotary position of at least one contact element and preferably several contact elements centrally. Thus, the setting device may e.g. be hinged in a central or middle region to thus vary the rotary position of the contact elements.

In a further advantageous embodiment, the guiding device comprises a coupling device coupling a rotational motion of a first contact element relative to the extension direction with the rotational motion of a second contact element relative to the extension direction.

Advantageously, a coupling device is provided which couples the rotational motions of several contact elements and preferably all contact elements with each other.

This coupling device may e.g. be a rod-like body pushed or inserted through openings of several spaced-apart contact elements. This rod-like body may extend parallel to the extension direction and/or parallel to the support. Furthermore, the coupling device may also be a sheath body (and also elongated) surrounding the contact elements, which nevertheless couples the rotational motions of the individual contact elements with each other. Both the elongated rod-like body and the sheath body can preferably be twisted relative to the support and thus also cause rotation of the individual contact elements.

Alternatively or additionally, it would also be possible to have a bellows disposed on the rod-like body. The rod-like body could then be configured as a tube. The rod-like body itself could also be such a bellows.

Preferably, the elongated body (which is designed in particular in the form of a rod-shaped body or a shroud body) is coupled with at least one, preferably with several and more preferably with all contact elements in a substantially rotationally fixed manner (with respect to rotation around the extension direction). Such a coupling can be positive, non-positive and/or frictionally engaged. The support is preferably arranged to be stationary and/or configured to be rigid. Preferably, the support extends along the extension direction.

In a further preferred embodiment, the contacting device is at least partially manufactured by 3D printing. It would thus be possible for the support and/or the contact elements disposed thereon to have been created by 3D printing. It would also be possible to design only the individual contact elements by 3D printing. The advantage of such an approach is the possibility of manufacturing this contacting device and/or its components very individually.

Furthermore, it would also be possible for the shroud body to be in communication with the individual contact elements by means of engagement elements. Furthermore, it would also be possible for the shroud body to be manufactured by 3D printing In a further advantageous embodiment, at least one contact element is and preferably several contact elements are mounted eccentrically relative to the extension direction. With this eccentric support, variation of the distance between the contact surface and the extension direction can also be achieved by rotating the contact elements.

In a further advantageous embodiment, the contact elements are arranged adjacent one another along the extension direction. In a further advantageous embodiment, these contact elements are spaced apart by a distance of more than 2 cm. In a further advantageous embodiment, the contact elements are spaced apart by a distance of less than 10 cm, preferably less than 8 cm, preferably less than 6 cm, preferably less than 4 cm. This spacing is specifically the spacing between the contact elements disposed on the guiding rod (or the support). Preferably, this spacing is with respect to the guiding rod (or the support). Advantageously, no spacing or only a very small spacing should be formed at the guiding surface itself. In this manner, very gentle guiding of the objects or containers is achieved. Preferably, gaps occurring at the guiding surface or the guiding part are smaller than 4 mm, preferably smaller than 2 mm.

Spacing between two contact elements is preferably achieved by means of spacers. The spacers preferably compensate angular deviations from one contact element to the next, and thus ensure a defined position of the spacers with respect to the circumferential direction. In a further advantageous embodiment, a spacer forms a pair of a calotte shell segment and a matching socket. This is advantageous for a positive and low-friction adjusting operation.

In a further advantageous embodiment, the contact element is configured to be disc-shaped. Particularly preferably, the disc-shaped contact elements are perpendicular to the extension direction.

Advantageously, the guiding device comprises a shroud body surrounding at least portions of the support. It is possible and preferred for the shroud body to fully surround at least a portion of the support in its circumferential direction in its extension direction. Preferably, said shroud body also surrounds the contact elements, in particular in their circumferential direction. Thus, both the support and the contact elements are preferably disposed inside said shroud body. However, it would also be possible to provide a plurality of such shroud bodies connected to each other in series in the extension direction. Straight guides (tubes) can also be combined with curved sections for e.g. a tangential exit from a carousel.

In a further advantageous embodiment, the shroud body is configured to be substantially torsionally rigid. Thus, it is possible for the shroud body to be flexible but substantially unable to be twisted. Due to this torsional rigidity, a coupling of rotational motion of the individual contact elements with each other (in particular by the shroud body) can be achieved. Thus, the shroud body could e.g. be a corrugated hose and/or a Teflon hose. In addition, a metal hose can also be provided.

Preferably, the shroud body has an outside diameter greater than 50 mm, preferably greater than 70 mm, preferably greater than 80 mm, preferably greater than 80 mm, particularly preferably greater than 90 mm and particularly preferably greater than 100 mm. Preferably, the shroud body has an outside diameter smaller than 200 mm, preferably smaller than 180 mm, preferably smaller than 160 mm and particularly preferably smaller than 150 mm.

It is desirable for this shroud body to be able to achieve an elongation in the axial direction of at least 30%, preferably of at least 40% and particularly preferably of at least 50% with respect to the untensioned length. This length variation serves to compensate variations in the path length for different setting variants along the guiding contour. In an embodiment with bellows, the pleats are preferably no deeper than 40 mm, preferably no deeper than 25 mm. Preferably, the pleats are deeper than 5 mm, preferably deeper than 10 mm.

In a further preferred embodiment, it is also conceivable for the shroud body to be constructed from several segments. It is conceivable that these several segments can be pushed together via connection mechanisms. The contact elements could also already be integrated in the shroud body. Thus, the shroud body could be constructed in segments with the contact elements disposed therein, wherein the individual segments can be assembled according to the application.

The shape of the pleat tips is advantageous if it has a straight contour, and is particularly advantageous if it has a concave radius which substantially and in particular exactly equals the smallest possible radius of the guide contour. It is of advantage for the function if the sum of the pleat width at the tip of all pleats is as close as possible to the length of the profile used for guiding.

In a further advantageous design, the wall thickness of the hose should be greater than 1.0 mm, preferably greater than 1.5 mm. This benefits the required rigidity with respect to torsion and the vibration behaviour of the pleats.

In a further advantageous embodiment, the shroud element is configured to be hose-like. Advantageously, the apparatus has two such hose bodies, each surrounding two segments of the guiding device, in particular including their contact elements.

Advantageously, the shroud body forms the contact surface for contacting the containers. It is however conceivable that further contact elements are provided on the shroud body and in particular with respect to the support outside the shroud body, which can, in particular, be twisted together with the shroud body. This configuration is suitable, in particular, for guiding star wheels, on the outside circumference of which the containers to be transported are held.

In a further advantageous embodiment, the apparatus comprises a measuring device which serves for (in particular automatically) adapting the contacting device to the respective application. A frequency measurement may enable self-regulation of the fittings to the ideal dimension. If the bottle guide is too tight, the shroud body will be excessively excited. At a low frequency, the fittings are not yet sufficiently close to the application.

It is furthermore conceivable that the shroud body comprises a protective layer on its outer surface, e.g. a layer reducing the coefficient of friction with the containers to be transported.

In a further advantageous embodiment, the shroud element is elastic. In particular, the shroud body is made from an elastic material, e.g. a rubber material. The shroud body may thus be a rubber hose.

In a further advantageous embodiment, the shroud body lies against the contact elements under tension. Thus, for example, it would be possible that, for installing or fitting the shroud body, the contact elements or components thereof are retracted and the contact elements subsequently extended so that the shroud body is securely connected to the contact elements. In this manner, slipping of the shroud body relative to the contact elements can be prevented.

In a further advantageous embodiment, at least one tensioning element, which can be advanced towards the shroud body, is disposed on the contact elements. Thus, for example, a lever element that can be advanced towards the shroud body and thus causes tensioning could be disposed on a support of the contact element and be pivotable relative to this support.

Preferably, the contact element also comprises at least one biasing device biasing the tensioning element towards the shroud body and in particular its internal wall. Thus, e.g. such a tensioning element could be disposed on the contact element by means of a hinge and be pivotable in particular with respect to a pivoting axis parallel to the extension direction. Advantageously, the biasing device is a spring, in particular a coil spring.

In a further advantageous embodiment, a specifically rod-shaped body is insertable into a predetermined opening in the contact element, wherein inserting this rod-shaped body causes at least one tensioning element to be pivoted relative to the support. In particular, this is a movement which pulls back the tensioning element, in particular retracts it radially with respect to the contact element. In this manner, the rod-shaped body can serve in particular as an installation aid to facilitate mounting of the shroud body on the contact elements. Preferably, at least a portion of the tensioning element projects into a cross-section of said opening when there is no rod-shaped body in the opening. Inserting the rod-shaped body causes this section to be urged outwards. Preferably, at least portions of the tensioning element are made from a plastic material, and in particular the region intended to lie against the shroud body is made from a plastic material. Preferably, the tensioning elements are clamping levers.

Preferably, the contact element comprises at least two of said tensioning elements and particularly preferably at least three such tensioning elements. These tensioning elements are preferably each pivotable around predetermined pivoting axes, wherein these pivoting axes are preferably parallel to each other. Preferably, the tensioning elements are evenly distributed in a circumferential direction of the contact elements.

In a further advantageous embodiment, the shroud element is movable relative to the support. Thus, it is possible to adjust the contact elements and also the shroud body along with the contact elements.

In a further advantageous embodiment, the contact elements are rotatable relative to the extension direction in a plane perpendicular to the extension direction. It is thus conceivable that, as mentioned above, the contact elements are arranged in series and the extension direction is perpendicular to each of the individual contact elements, and in this manner, the contact elements can be rotated relative to the extension direction. However, it would also be possible to tilt the contact elements relative to the extension direction, in particular with respect to an axis perpendicular to the extension direction and also parallel to the containers to be transported and which specifically extends vertically. A radius variation could also be achieved by such tilting.

In a further advantageous embodiment, the contact elements are arranged to be rotatable relative to the support. Here, e.g. mounting locations may be provided which cause the contact elements to be fixed in the extension direction but at the same time arranged to be movable relative to the support. However, it would also be possible for the support in its entirety to be rotatable with respect to the extension direction, and in this case, for the contact elements to be rotated together with the support.

In a further advantageous embodiment, an outside cross-section of the contact elements is adjustable, in particular for installation purposes of the shroud body.

The present invention is furthermore directed towards a transport device for transporting containers with at least one guiding device of the type described above. Advantageously, the transport device comprises at least one support on which the containers can be transported. It is thus conceivable that the containers are transported by means of a support, and in particular by means of a rotatable support, on the outside circumference of which recesses for receiving each of the containers are disposed. The guiding device described herein can act as a counter element, by means of which the containers are guided.

In addition, it is however also conceivable that the guiding device is disposed on the rotatable support. Preferably, the transport device comprises a first guiding device of the type described above and a second guiding device of the type described above, and the plastic containers are preferably transported between these two guiding devices. Preferably, the containers are at least intermittently contacted by both guiding devices and/or guided between the two guiding devices.

In a further advantageous embodiment, at least one of the guiding devices described herein is arranged to be stationary. Preferably, the other guiding device is arranged to be movable and in particular rotatable.

Subject to the respective containers, it is possible, as mentioned above, to vary the position of the contact surface relative to the extension direction. For this, the contact surfaces of both guiding devices are preferably varied, in particular to maintain equal pitch circles for the transport motions, even with varying container geometries.

In a further advantageous embodiment, the transport device comprises at least two support elements, to also hold the guiding device in a predetermined position. Thus, support elements such as supports could e.g. be disposed at the end regions of the guiding device. In a further advantageous embodiment, the support device comprises a setting device for adjusting the guiding device. In particular, the positioning of the contact surface can be varied in this manner, as mentioned above.

Further advantages and embodiments will become apparent from the appended drawings, in which:

FIGS. 2a-2c show the guiding device of FIGS. 1a-1c in a first positioning;

FIGS. 3a-2c show the guiding device of FIGS. 1a-1c in a second positioning;

FIG. 4 shows an illustration of an apparatus for transporting containers in a guiding device according to the invention;

FIGS. 9a-9g show detailed illustrations of a contact element.

Figure 1A:
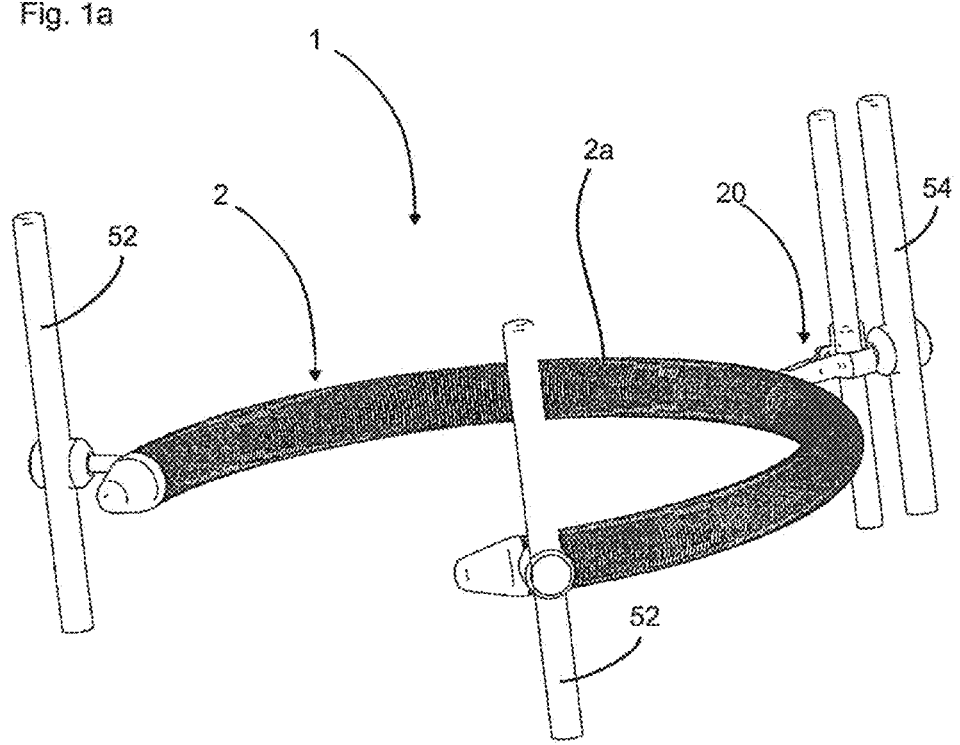
FIGS. 1a-1c show three illustrations of a guiding device according to the invention.
Figure 1B:
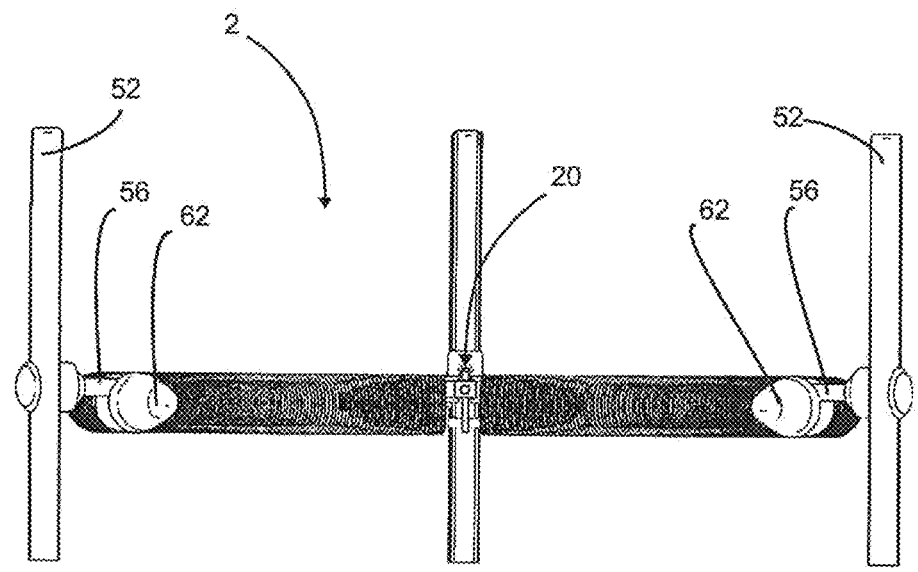
Figure 1C:
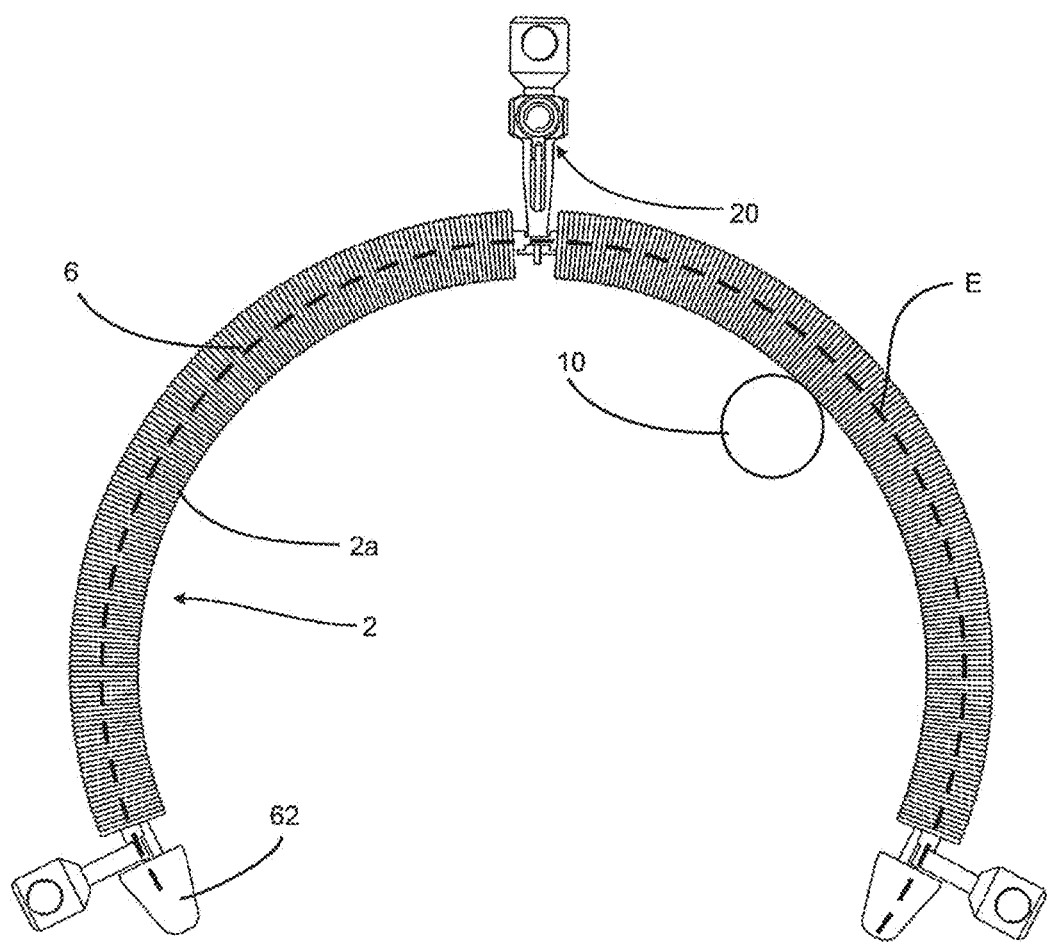

FIGS. 1a-1c show a first embodiment of a first guiding device 1 according to the invention. This guiding device 1 comprises a contacting device designated in its entirety with 2. This contacting device forms a contact surface 2a guiding the containers in operation, namely via contact with an outside circumference of these containers. Reference numerals 52 designate end-side supports serving (by means of retaining rods 56) to retain the contacting device. Reference numeral 54 designates a further support serving to hold a central or middle region of the contacting device. Reference numeral 20 designates a setting mechanism which, as is described in more detail below, serves to vary the contact surface 2a, or more specifically serves to radially adjust contact surface 2a inwards.

FIG. 1b shows a side view of the apparatus shown in FIG. 1a. In this embodiment, end-side elements 62 of the contacting device, respectively terminating this can also be seen. These terminating elements 62 have bevels into which the plastic preforms to be transported can also be inserted.

FIG. 1c shows a plan view of a guiding device according to the invention, and more specifically of contacting device 2. A container 10 is again illustrated schematically, which is transported along this contacting device in working operation. An adjustment of the contacting device as described above enables adjustment of the internal radius of contact surface 2a further inwards or further outwards. As will be set out in more detail below, this adjustment can be carried out centrally by adjusting mechanism 20. Reference numeral E designates the extending device, more specifically the geometric extending device, along which the contacting device extends. Contact surface 2a is variable relative to this extending device and in particular variable in a spacing perpendicular to extension direction E. A transport star wheel which transports the containers can be provided within contact surface 2a for transporting the containers. This transport star wheel can (see FIG. 7a-8b) also comprise a guiding device of the type described herein.

Reference numeral 6 designates a shroud body surrounding contact elements disposed inside this shroud body. By adjusting the contact elements, positioning of contact surface 2a can also be varied. As mentioned above, this shroud body is preferably designed to be flexible or torsionally rigid. Preferably, this shroud body also acts as a coupling device coupling the rotational motion of individual contact elements when an adjustment is made.

FIGS. 2a-2c show a detailed illustration of the guiding device. It can be seen (in comparison to FIGS. 3a, 3b) here that contact surface 2a is in particular continuously adjustable between two radii. Here, reference numeral R1 designates the pitch circle radius, i.e. the pitch circle along which the containers are transported. Reference numeral R2 designates the radius set in FIGS. 2a-2c. For this purpose, it is possible to adjust or twist two setting elements relative to each other, and in this manner adjust contact elements (in particular together with shroud body 6) inside shroud body 6. Thus, external contact elements can comprise hinge elements which are component parts of the adjusting mechanism 20.

FIG. 2b shows a detailed illustration of setting mechanism 20. A first rod can be seen, which is hinged at a first point or hinge 32 of contacting device 2. A second rod 22, which is pivotable by means of a hinge 28, is disposed at a second point 34 of the contacting device. The contacting device can be twisted by means of relative displacement of these two pivoting rods 22, 24. This is also shown in FIG. 2c. Here, e.g. a slider 36 can be displaced relative to support rod 38. More specifically, plate 35 and can thus be pivoted as well as, via the torsion-free shroud body, the other contact elements disposed inside the shroud body (opposite the stationary support, respectively). Reference numeral 26 designates a further hinge or hinging means for hinging the rod 24.

Figure 3A:
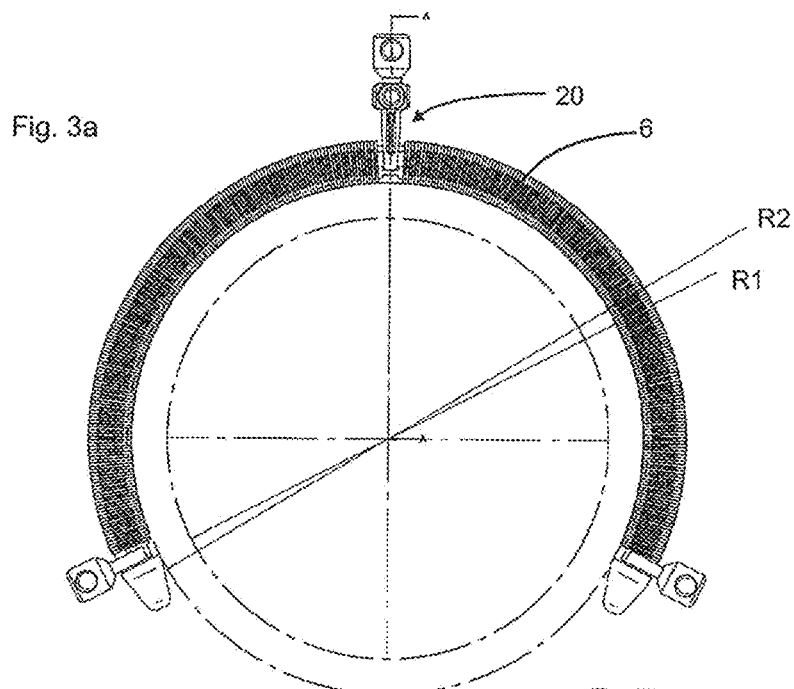
Figure 3B:
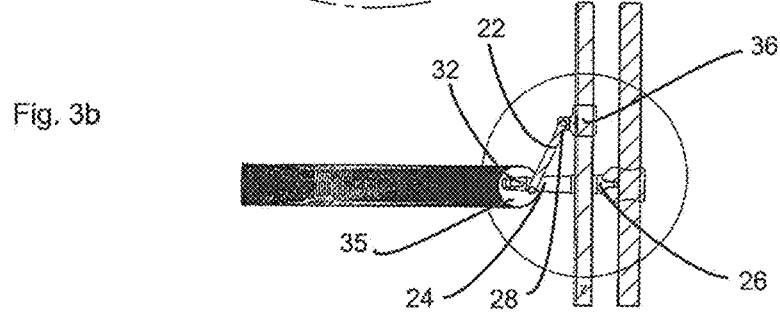
Figure 3C:
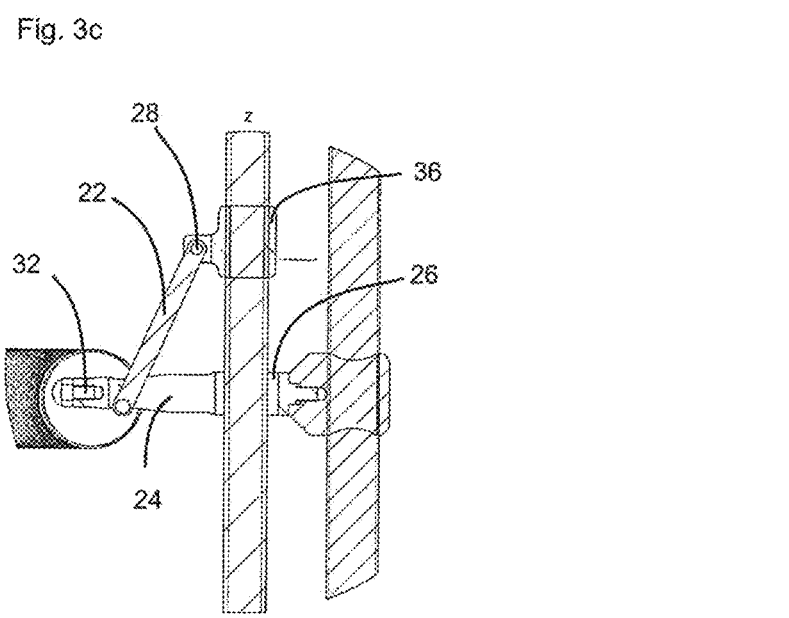

FIGS. 3a-3c show a further positioning of the contacting device with inside radius R2. The different positioning can be seen in particular in FIGS. 3b and 3c. Here, slider 36 was guided upwards, and in this manner, tie rod 22 was also pulled upwards, and thus a hinge point 34 was also adjusted relative to the other hinge point 32 on contacting device 2. In this manner, contact elements disposed inside shroud body 6 can also be twisted and the radius of the contact surface can be adjusted.

FIG. 4 shows an overall illustration of an apparatus for transporting containers comprising a guiding device 1 according to the invention. It is possible for transport star wheels 104, 106 and 108 (only roughly illustrated schematically by their respective pitch circles) to be provided, which transport the containers e.g. on an outside circumference. In addition, stationary guiding bends 102 and 108 are also provided. The guiding device 1 according to the invention is disposed between these two guiding bends permitting an adjustment of the guiding diameter. Transport start wheel 104 can comprise a guiding device 1, so that the containers are guided between two guiding devices 1 according to the invention. In case of a conversion to other container geometries, in particular other container radii, a pitch circle radius can be maintained by converting both guiding devices.

Figure 5:
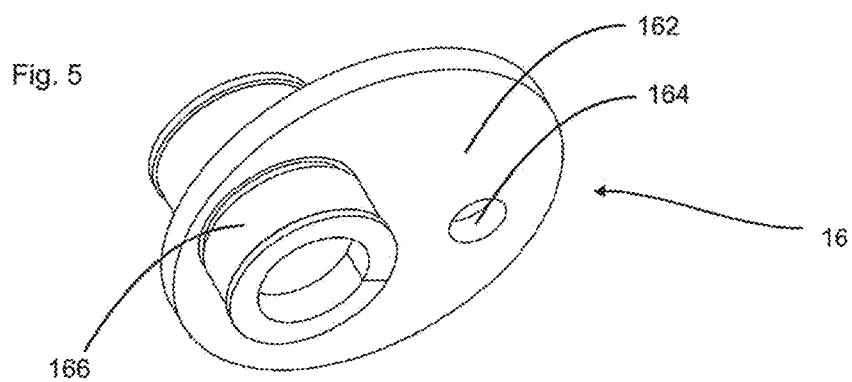
FIG. 5 shows an illustration of a contact element.

FIG. 5 shows an illustration of a contact element 16. This contact element 16 comprises a plate-shaped base body 82 is eccentrically disposed with respect to a geometric pivoting axis, here extending centrally through guiding sleeve 166. In this embodiment, contact element 16 is thus pivotable relative to a support (not shown in FIG. 5). Reference numeral 164 designates a further opening, through which a pivoting rod can be inserted. When this pivoting rod is pivoted relative to the central support (not shown), contact element 16 can also be twisted relative to the support in this manner. Due to the eccentricity, the outer surface or edge of the contact element is displaced as a result. In this manner, an overall guiding diameter or radius can be varied.

Figure 6A:
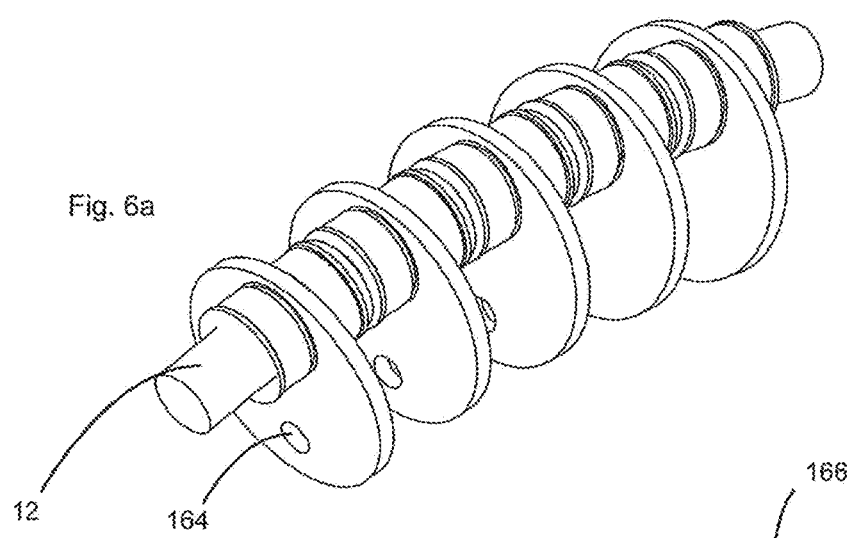
FIGS. 6a-6c show three illustrations of contact elements disposed on their support.

FIG. 6a shows an illustration in which a plurality of contact elements 16 is pivotably or rotatably disposed on a support 12. Again, the eccentric arrangement and the possibility of also varying a transport radius by pivoting the contact elements can be seen.

Figure 6B:
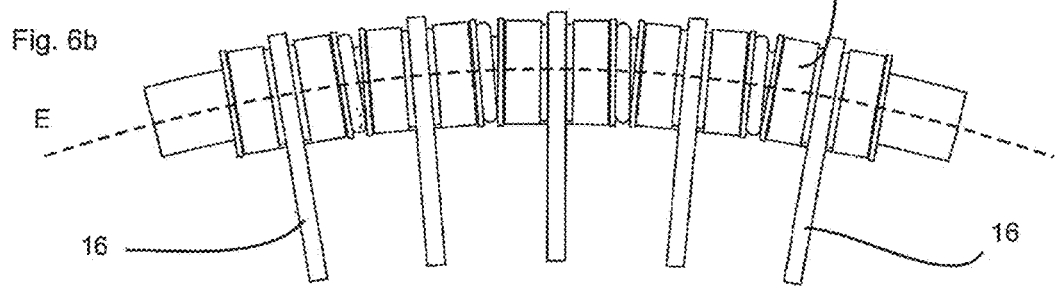

FIG. 6b shows a further illustration of contact elements 16 disposed on support 12, namely rotatably in a respective plane perpendicular to extension direction E. In FIG. 6b, the eccentric support of contact elements 16 can again be seen.

Hinge-like connections can also be provided between individual contact elements 16, which enable a hinged plate or the contact element to be angled relative to the adjacent hinged plate at a non-zero angle, and which also permit rotation of all contact elements together relative to the extension direction.

Figure 6C:
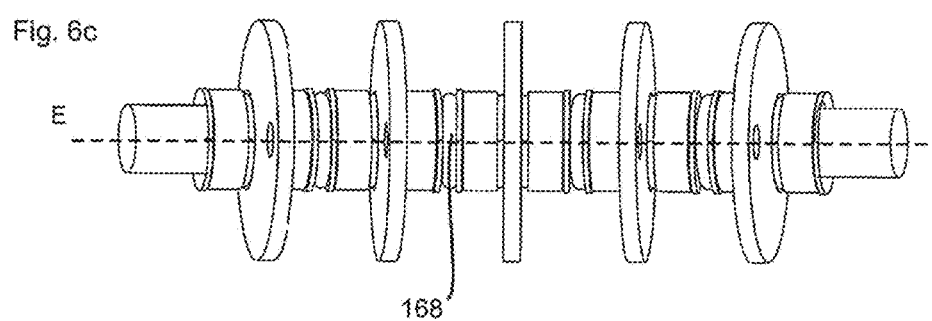

As can be seen from FIG. 6c, these individual hinge-like elements 168 are each disposed between respective adjacent contact elements 16. It can further be seen that base support 162 has an elliptical shape. This has the advantage of enabling continuous adjustment of the radii from a first extreme value (semi-major axis of the ellipse) to a second extreme radius (semi-minor axis of the ellipse) in this manner.

Figure 7A:
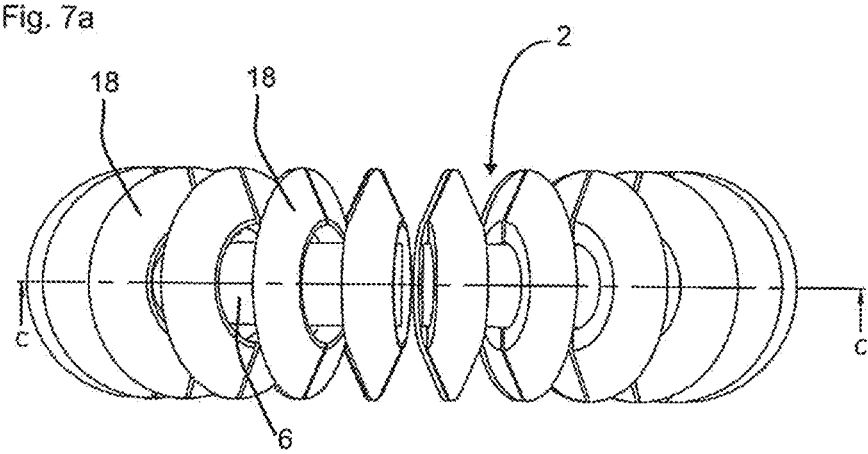
FIGS. 7a, 7b show two illustrations of contact elements of an internal guide.
Figure 7B:
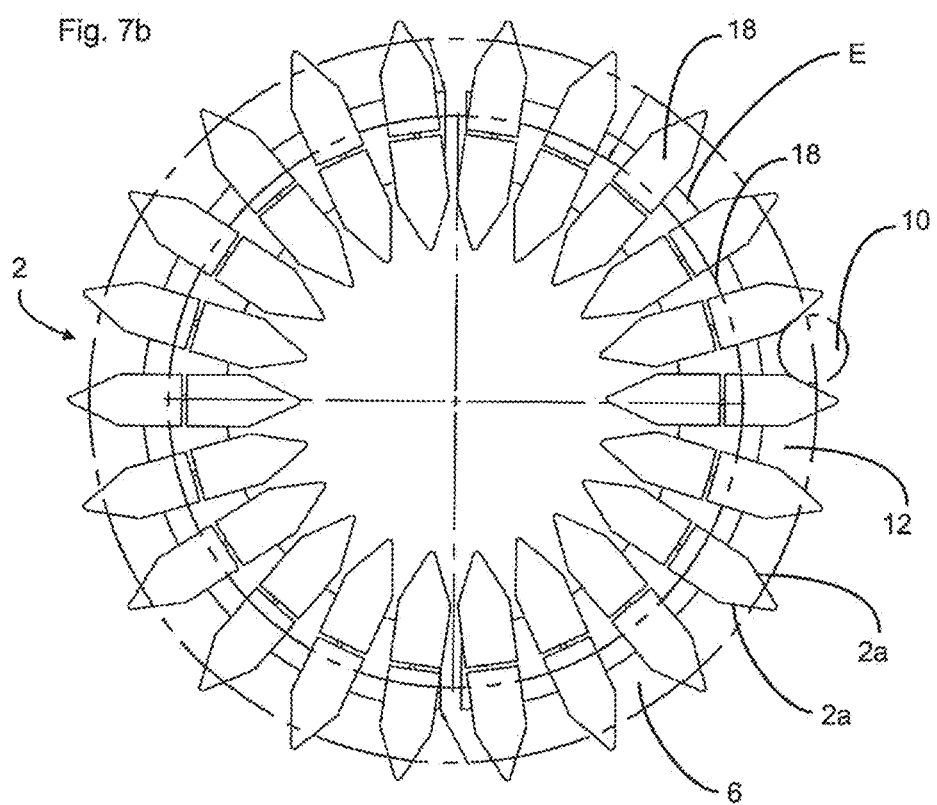

FIGS. 7a, 7b show a further embodiment of a guiding device 1 according to the invention. This embodiment is for internal guides and/or transport star wheels. For this embodiment, external contact elements or holding devices 18, here in the form of disk-like formations, are again arranged on the shroud body 6 to be rotatable (relative to extending device E, but preferably fixed relative to the shroud body 6). The contact elements described above are again provided inside shroud body 6. External contact elements 18 can e.g. be clamped to shroud body 6. These external contact elements can e.g. be configured to be in two parts and screwed onto shroud body 6 for installation. The external contact elements 18 each form the contact surface 2a for the containers. In this embodiment, the containers thus preferably do not lie directly against shroud body 6.

Depending on the rotary position of these contact elements 18 relative to support 12, the position of contact surface 2a can again be varied relative to the extension direction. This means that external contact elements 18 are again arranged eccentrically (relative to extension direction E). As shown in FIG. 7b, the arrangement shown here can also be used in a manner where containers 10 to be filled lie in spaces between two adjacent contact elements 18 and are transported e.g. relative to a stationary wall (which is advantageously formed as a guiding device according to the invention). In this way, rotation of the contact elements relative to the support can again vary a guiding radius. Here, the containers are respectively guided by two adjacent external contact elements or between them. For this purpose, the external contact elements may have inclined guiding surfaces enabling secure guiding of the containers between two respective adjacent contact elements, even in case of radial adjustment. In the embodiment shown in FIGS. 7a-8b, external contact elements 18 are thus also part of contacting device 2.

Figure 8A:
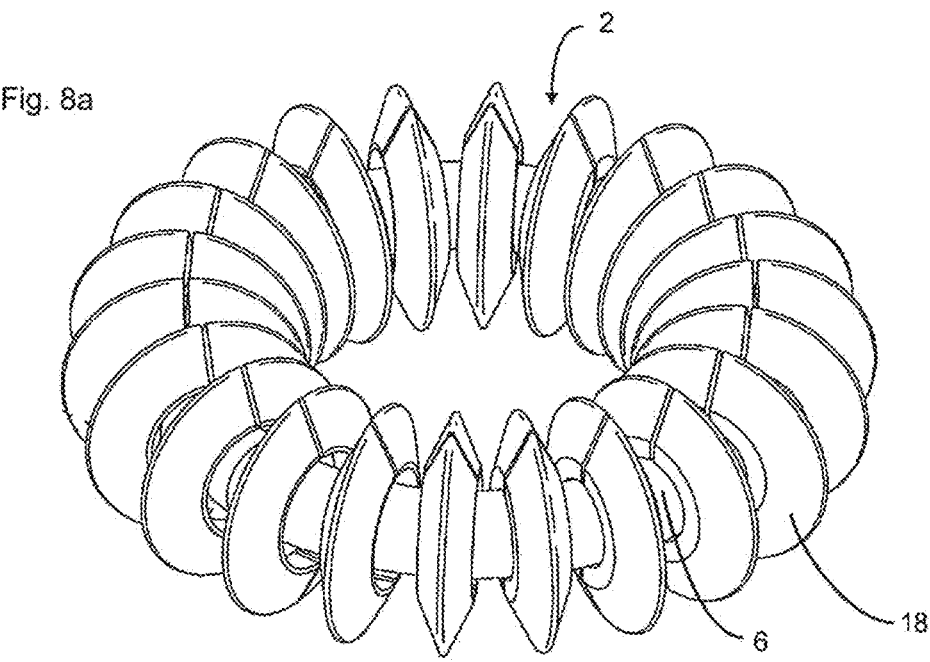
FIGS. 8a, 8b show two illustrations of contact elements of the internal guide in a second positioning.
Figure 8B:
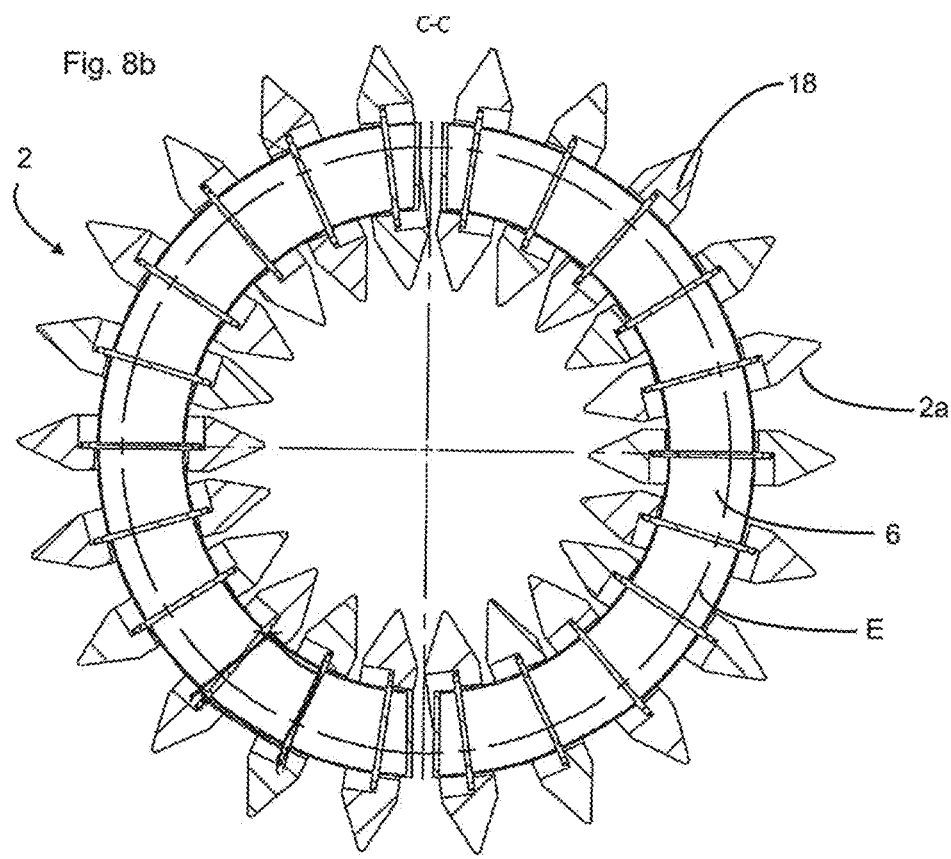

FIG. 8a shows a further positioning of a corresponding guiding device. Contact elements 18 are again provided and disposed rotatably on support 12 or shroud body 6, respectively. As can be seen from a comparison of FIGS. 8b and 7b, in this positioning, the individual elements are adjusted outwards in the radial direction. In this manner, the pitch circle can be maintained, even for different container sizes.

FIGS. 9a to 9g show different embodiments of contact elements 16. The contact elements have integrated tensioning mechanisms, which enable tensioning of the contact element relative to shroud body 6. In the embodiment shown in FIG. 9a, a total of three clamping bodies or clamping levers 184 are provided, which are adjusted or urged under the force from springs 176 so that a portion 184a projects to the outside. Reference numeral 172 designates a lower portion of clamping lever 172, 184 which is pivotally mounted by means of a hinge 180. As mentioned above, appropriate pivoting can urge portion 184a radially outwards and in particular against shroud body 6. Reference numeral 182 designates an end portion of clamping lever 184 which projects into opening 185 and which is displaced or urged outward when the expanding mandrel is inserted.

Reference numeral 178 designates an opening through which the support (not shown) can be inserted. This opening has a circular cross-section so that an also circular support can be inserted and thus enable the contact element to be rotated relative to the support. Spring element 146 is designed in particular for engagement with the shroud body without damaging the shroud body. Clamping lever 174 serves to transmit an adjusting torque to the base shaft or the respective contact element. This clamping lever can be made of a plastic material but an elastomer insert is also conceivable so as not to damage the shroud body and to increase the security of engagement.

Figure 9A:
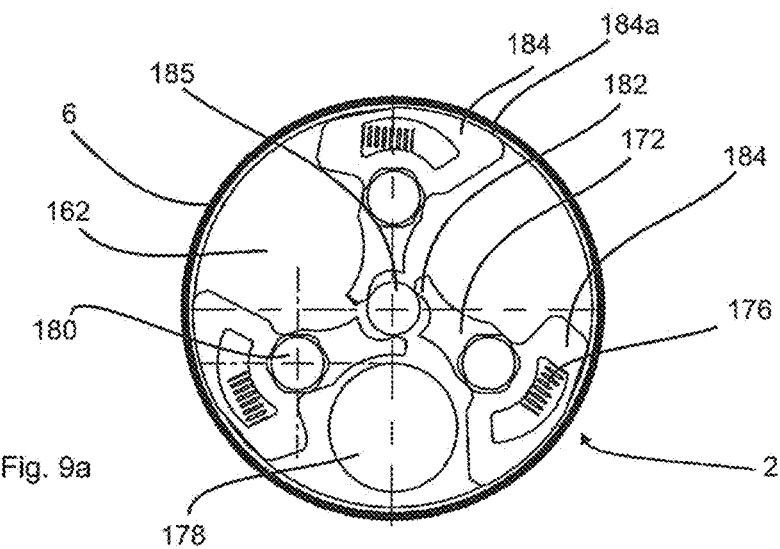
Figure 9B:
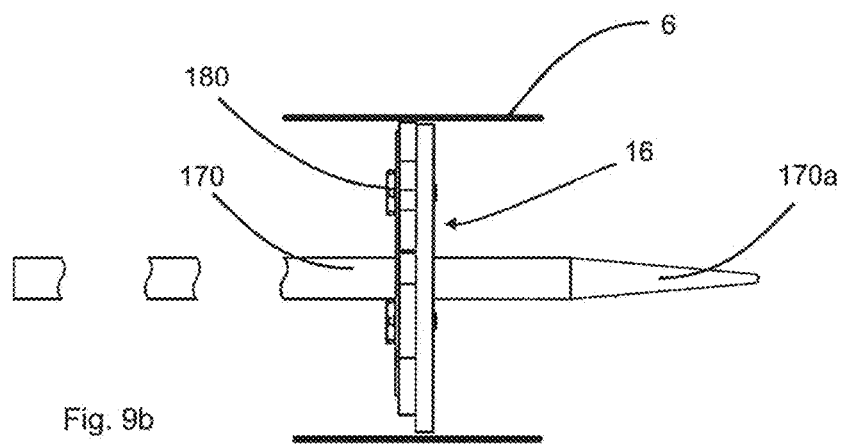

FIG. 9b shows an illustration in which an expanding mandrel 170 has been inserted into contact element 12. This expanding mandrel comprises a base body 170 and an expanding cone 170a. In the illustration shown, the expanding mandrel is formed to be round, however, it can also be formed as a structural section, e.g. a hexagonal steel section. A hexagonal steel section is suitable for the present embodiment as there are three clamping pieces or clamping bodies. If e.g. four clamping pieces are being used, a square section could also be used.

Thus, the individual clamping systems 172, 176, 184 cannot twist on expanding mandrel 170, in particular when the shroud body is being pushed on, and subsequent pulling of the assembled system onto the curved shaft (which represents the radius for the fittings) is simplified. Thus, the expanding mandrel also serves in particular as an installation aid. Inserting the expanding mandrel retracts the individual clamping elements 176, and the shroud body can be more easily pulled over the individual contact elements. After pulling on the shroud body, the expanding mandrel can be removed and the clamping levers will push (from inside) against shroud body 6.

Figure 9C:
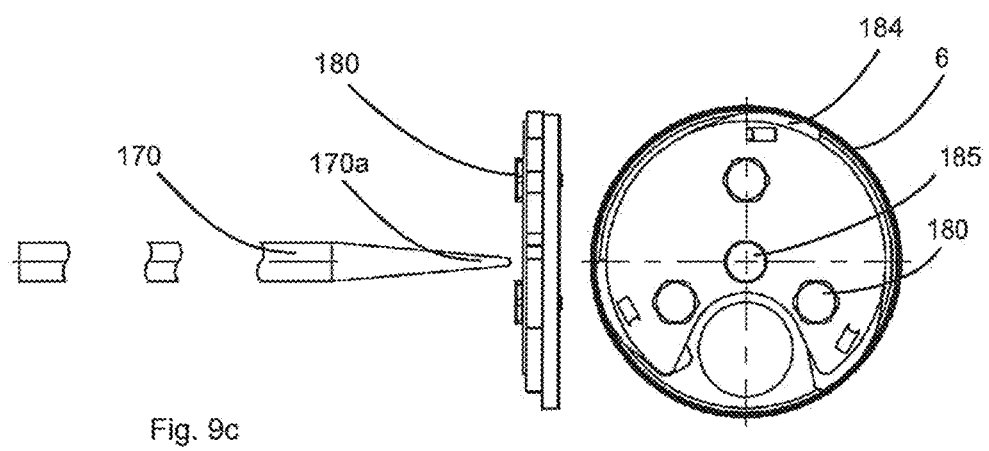

FIG. 9c shows a situation in which expanding mandrel 170 is retracted from the contact element. It can be seen that clamping lever 184 again pushes or is tensioned against the inside wall of shroud body 6. Opening 185 can again be seen, into which expanding mandrel 170 is inserted. In the situation shown here, clamping levers 184 are extended, and withdrawing the expanding mandrel pushes the individual clamping jaws against the inside wall of the shroud body due to the spring pressure of spring 176. Thus, rotational motion of the tube introduced in individual cases will be transmitted well to the curved shaft. Thus, better adjustment quality can be achieved as all clamping systems follow the twisting motion.

FIG. 9d shows an illustration in which the expanding mandrel is inserted into contact element 12. In this state, clamping levers 184 are retracted towards the centre so that the shroud body can be more easily pushed on. In the situation shown in FIG. 9e, expanding mandrel 170 is not yet inside opening 185, and because of this, clamping levers 184 are set outwards (due to the application of force by spring elements 176). This situation is also shown in FIG. 9g. FIG. 9f shows a situation in which the expanding element is inserted and the individual clamping levers 184 are thus retracted. Reference numerals 186, 188 designate mounting plates that serve for installing the clamping levers. Here, these two mounting plates form base support 162.

The applicant reserves the right to claim all features disclosed in the application documents as essential for the invention as long as they are novel, individually or in combination, with respect to the state of the art. It should further be noted that in the individual figures, features which may be advantageous in their own right have also been described. A person skilled in the art will immediately appreciate that a certain feature described in a figure may be advantageous even without adopting further features from this figure. A person skilled in the art will further appreciate that advantages may also result from a combination of several individual features or features shown in different figures.

LIST OF REFERENCE NUMERALS

1 guiding device
2 contacting device
2a contact surface
6 shroud body
10 container
12 support
16 contact element
18 external contact element
20 adjusting mechanism
22, 24 rod
26, 28, 32 hinge
34 point
35 plate
36 slider
38 support rod
52 end-side support
54 further support
56 retaining rod
62 termination elements 82 base body
104, 106,
108 transport star wheels
102,110 guiding bends
162 base support
164 further opening
166 guiding sleeve
168 hinge-like element
170 expanding mandrel
170a expanding cone
172 lower portion of clamping lever
176 spring
178 opening for support
180 hinge
184 clamping lever
184a portion of clamping lever
185 opening
186, 188
E extension direction
R1 pitch circle
R2 radius formed by contact surface 2a

The invention claimed is:

1. A guiding device for contacting and guiding objects and in particular containers with a contacting device which is suitable and intended for contacting an outside surface of the object to be guided by a contact surface, wherein the contacting device comprises:
a support extending along a predetermined extension direction, wherein the guiding device comprises a plurality of contact elements disposed on the support, wherein the contact elements are each rotatable relative to the extension direction of the support such that a spacing between at least a portion of the contact surface and the extension direction is variable by the rotational motion, and wherein the guiding device comprises a shroud body which at least partially surrounds the support.

2. The guiding device according to claim 1, wherein the guiding device comprises at least one setting device for varying the rotary position of at least one contact element relative to the extension direction.

3. The guiding device according to claim 2, wherein the guiding device comprises a coupling device which couples a rotational motion of a first contact element relative to the extension direction with the rotational motion of a second contact element relative to the extension direction.

4. The guiding device according to claim 1, wherein the contact elements are arranged adjacent one another along the extension direction.

5. The guiding device according to claim 1, wherein the shroud body forms the contact surface for contacting the containers.

6. The guiding device according to claim 1, wherein the shroud body is elastic.

7. The guiding device according to claim 1, wherein the shroud body lies against the contact elements under tension.

8. The guiding device according to claim 1, wherein the contact elements are rotatable relative to the extension direction in a plane which is perpendicular to the extension direction.

9. The guiding device according to claim 1, wherein the contact elements are mounted rotatably relative to the support.

10. A transport device for transporting containers with at least one guiding device according to claim 1.

11. The transport device according to claim 10, wherein the transport device comprises two guiding devices according to at least one of the preceding claims, and the containers are transportable between these two guiding devices.

* * * * *